United States Patent
Raffaelli (10) Patent No.: US 11,492,062 B2
(45) Date of Patent: Nov. 8, 2022

(54) SHOCK ABSORBER ASSEMBLY OF A VEHICLE WITH SELECTIVE KINEMATIC LOCKING, VEHICLE SUSPENSION GROUP AND RELATED VEHICLE

(71) Applicant: PIAGGIO & C. S.P.A., Pisa (IT)

(72) Inventor: Andrea Raffaelli, Pontedera (IT)

(73) Assignee: PIAGGIO & C. S.P.A., Pisa (IT)

(*) Notice: Subject to any disclaimer, the term of this patent is extended or adjusted under 35 U.S.C. 154(b) by 300 days.

(21) Appl. No.: 16/617,086

(22) PCT Filed: May 25, 2018

(86) PCT No.: PCT/IB2018/053750
§ 371 (c)(1),
(2) Date: Nov. 26, 2019

(87) PCT Pub. No.: WO2018/215990
PCT Pub. Date: Nov. 29, 2018

(65) Prior Publication Data
US 2021/0147031 A1 May 20, 2021

(30) Foreign Application Priority Data
May 26, 2017 (IT) .................. 102017000057500

(51) Int. Cl.
*B60G 15/06* (2006.01)
*B62K 5/10* (2013.01)
(Continued)

(52) U.S. Cl.
CPC .................. *B62K 5/10* (2013.01); *B62K 5/08* (2013.01); *B60G 2204/4605* (2013.01);
(Continued)

(58) Field of Classification Search
CPC ..... B60G 15/062; B60G 17/056; B62D 63/04
(Continued)

(56) References Cited

U.S. PATENT DOCUMENTS 2,601,551 A * 6/1952 Navarro ................. A43B 13/32
267/64.17
2,896,965 A * 7/1959 Moustakis ........... B60G 15/062
280/6.16
(Continued)

FOREIGN PATENT DOCUMENTS

CN 104819242 A 8/2015
CN 104912993 A 9/2015
(Continued)

OTHER PUBLICATIONS

Taiwan IPO Examination Report For Corresponding Patent Application No. 107118151; dated Sep. 10, 2021.
(Continued)

*Primary Examiner* — Christopher P Schwartz
(74) *Attorney, Agent, or Firm* — Cantor Colburn LLP (57) ABSTRACT

A shock absorber assembly including a first sheath slidingly housing inside it a first piston which is filled with hydraulic fluid, the first piston having a first stem extending from the first sheath and a first head contained inside the first sheath, a second sheath slidingly housing inside it a second piston which is filled with hydraulic fluid, the second piston having a second stem extending from the second sheath and a second head contained inside the second sheath. The first and second sheaths are fluidly connected to each other by means of at least one upper duct and a first interconnection duct passing through a control body. The control body houses at least one damping valve including a damping plate having holes suitable to allow a calibrated passage of the hydraulic fluid channelled by the first and second sheaths towards the control body; the control body houses a control valve connected to actuator means to be movable, in a regulation stroke, from an unlocked position, in which it does not interfere with the upper duct to a locked position, wherein the upper duct is occluded.

20 Claims, 4 Drawing Sheets

(51) Int. Cl.
  *B62K 5/08*      (2006.01)
  *B62K 5/027*     (2013.01)
  *B62K 25/04*     (2006.01)
  *F16F 9/34*      (2006.01)
  *F16F 9/56*      (2006.01)

(52) U.S. Cl.
  CPC .... *B60G 2300/122* (2013.01); *B60G 2300/45* (2013.01); *B60G 2500/11* (2013.01); *B62K 5/027* (2013.01); *B62K 2025/047* (2013.01); *F16F 9/34* (2013.01); *F16F 9/56* (2013.01)

(58) Field of Classification Search
  USPC ....... 188/312, 322.22; 267/64.17; 280/5.509, 280/124.03, 6.16; 180/209, 210
  See application file for complete search history.

(56) References Cited

U.S. PATENT DOCUMENTS

| | | | | |
|---|---|---|---|---|
| 6,250,658 | B1* | 6/2001 | Sakai | B60G 17/0162 |
| | | | | 267/64.17 |
| 8,371,424 | B2* | 2/2013 | De Kock | B60G 13/06 |
| | | | | 188/322.21 |
| 9,045,015 | B2* | 6/2015 | Spahl | B62D 63/04 |
| 10,384,739 | B2* | 8/2019 | Marabese | B60G 17/056 |

FOREIGN PATENT DOCUMENTS

| | | |
|---|---|---|
| EP | 1571016 A1 | 9/2005 |
| JP | 6033041 | 10/1985 |
| JP | 2005247303 A | 9/2005 |
| TW | 201716283 A | 5/2017 |
| WO | 2008065436 A1 | 6/2008 |
| WO | 2016001722 A1 | 1/2016 |

OTHER PUBLICATIONS

International Search Report for corrsponding application PCT/IB2018/053750 filed May 25, 2018; dated Jul. 31, 2018.
Written Opinion of the International Searching Authority for corrsponding application PCT/IB2018/053750 filed May 25, 2018; dated Jul. 31, 2018.
Chinese Office Action for corresponding application 2018800495439 filed May 25, 2018; Report dated Nov. 23, 2020.
Japanese Search Report for corresponding 2019-565295; Report dated Jan. 5, 2022.

* cited by examiner

SHOCK ABSORBER ASSEMBLY OF A VEHICLE WITH SELECTIVE KINEMATIC LOCKING, VEHICLE SUSPENSION GROUP AND RELATED VEHICLE

TECHNICAL FIELD

The present disclosure relates to a shock absorber assembly of a vehicle with selective kinematic locking, a vehicle suspension group and related vehicle.

BACKGROUND

As is known, suspensions are elements connecting the vehicle frame to the wheels: said connection elements comprise at least one elastic element, typically a spring which allows the oscillations of the suspended mass (frame) relative to the unsuspended mass (wheel assembly), and at least one shock absorber i.e. a damper of said oscillations of the suspended mass.

Various solutions are known of in the art which involve adjusting the damping level of the shock absorbers according to the running conditions of the vehicle. These solutions aim to change the dynamics of the suspension so as to increase comfort or performance according to the users needs. In most cases the adjustments are not automatic but are performed manually, acting on special registers (typically screw registers).

Automated solutions are also known of in which the user requests, for example by means of a button on the dashboard or handlebar, a given adjustment and the system via suitable actuators, performs the adjustment automatically on said registers.

There are also some refined solutions that involve the use of magneto-rheological fluids which, if subjected to magnetic and/or electromagnetic fields, modify their rheological characteristics and thus the behaviour of the shock absorbers containing them.

These solutions can significantly change the response of the shock absorber, increasing, almost to total locking, the damping in a single direction.

BRIEF SUMMARY

Such prior solutions have several drawbacks however.

In fact, on the one hand they are quite complex and expensive to produce.

On the other hand, the solutions of the prior art are able to lock the damping and therefore the suspension in a single direction only, typically in the compression direction, while they are unable to achieve a two-way selective locking.

Such selective locking may be useful for example in conditions of the vehicle, typically a motorcycle, stopping or moving forward at extremely low speed in order to lock the motorcycle in a predetermined set-up condition, in terms of roll and/or pitch.

It is clear that locking of the rolling may be carried out in applications on weak multi-track vehicles, which are equipped with at least three wheels (of which two paired on the forecarriage or on the rear axle) or on a four-wheeled vehicle.

The need is therefore felt to resolve the drawbacks and limitations mentioned with reference to the prior art.

BRIEF DESCRIPTION OF THE DRAWINGS

Further characteristics and advantages of the present disclosure will be more clearly comprehensible from the description given below of its preferred and non-limiting embodiments, wherein.

The elements or parts of elements common to the embodiments described below will be indicated using the same reference numerals.

DETAILED DESCRIPTION

With reference to the aforementioned figures, reference numeral 4 globally denotes an overall schematic view of a vehicle which incorporates at least one shock absorber assembly 8 according to the present disclosure.

For the purposes of the present disclosure, it should be clarified that the term vehicle must be considered in the broadest sense, meaning both a manual traction vehicle, such as a bicycle and a motorcycle. The term motor cycle should also be considered in the broadest sense, preferably, but not exclusively, referring to a motorcycle, having two or three wheels, but even a motorised quad bike or the like.

The vehicle generally comprises a frame 12 comprising a forecarriage 16 supporting at least one front steering wheel 20, and a rear axle 24 supporting at least one rear wheel 28.

Such definition thus also encompasses tilting motor cycles having three wheels, of which for example two paired and steering front wheels 20', 20" on the forecarriage 16 and a rear drive wheel 28, on the rear axle 24, but also motorcycles which comprise a single steering front wheel 20 on the forecarriage 16 and two rear drive wheels 28 on the rear axle 24. Lastly, such definition also encompasses so-called quad bikes having two wheels 20', 20" on the forecarriage 16 and two rear wheels on 28 the rear axle 24.

The frame 12, forecarriage 16 and the rear axle 24 may be of any shape or dimension and may for example be of the trellis type, box type, die-cast and so forth.

The frame 12 may be in one piece or in several parts.

The rear axle 24 typically comprises a fork 32 which supports the saddle of the driver and/or passenger. The fork 32 is for example hinged to the frame 12 by a hinge pin 36. It is to be clarified that the connection between the fork 32 and the frame 12 may be direct, by direct hinging, or may also involve the interposition of lever mechanisms and/or intermediate frames.

The wheels, whether front or rear, are mechanically connected to the forecarriage and to the rear axle by means of respective wheel assemblies 40.

The wheel assembly 40 comprises the front or rear wheel 20,28, an elastic element (typically a spring, not shown) suitable for allowing an excursion of the wheel 20,28, and a shock absorber 44, suitable to damp the oscillations/excursions of the wheel 20,28.

The shock absorber assembly 8 comprises a first sheath 48 slidingly housing inside it a first piston 52 along a first sliding direction X-X.

The first sheath 48 is filled with hydraulic fluid, in a known manner.

The first piston 52 comprises a first stem 56 extending from the first sheath 48 and a first head 60 contained inside the first sheath 48.

The first head 60 slides in a calibrated manner inside the first sheath 48 so as to pressurise, if moved, the hydraulic fluid contained therein.

In particular, the first stem 56 and the first sheath 48 are suitable to be mechanically connected respectively to a wheel 20, 20', 20" and to a frame 12 or vice versa.

The shock absorber assembly 8 further comprises a second sheath 64 slidingly housing inside it a second piston 68 along a second sliding direction X"-X".

Preferably said first and second sliding directions are parallel to each other.

The second sheath 64 is filled with incompressible hydraulic fluid, in a known manner; said hydraulic fluid is the same as that circulating in the first sheath 48.

The second piston 68 comprises a second stem 72 extending from the second sheath 64 and a second head 76 contained inside the second sheath 64.

The second head 76 slides in a calibrated manner inside the second sheath 64 so as to pressurise, if moved, the hydraulic fluid contained therein.

The second stem 72 and the second sheath 64 are suitable to be mechanically connected respectively to a wheel 20, 20', 20" and to a frame 12 or vice versa.

The first and second sheaths 48, 64 are fluidly connected to each other by means of at least one upper duct 80 and a first interconnection duct 84 passing through a control body 88, substantially hollow and crossed by said hydraulic fluid.

The first and second piston 52, 68 move according to a motion of compression or juxtaposition of the respective heads 60, 76 to the upper duct 80, and a motion of extension or distancing of said heads 60, 76 from the upper duct 80.

The control body 88 houses at least one damping valve 92 comprising a damping plate 94 having holes 96 suitable to allow a calibrated passage of the hydraulic fluid channelled by the sheaths 48, 64 towards the control body 88. This calibrated passage of the hydraulic fluid performs the damping action, in a known manner.

In addition, the control body 88 houses a control valve 100 connected to actuator means (not shown) for example at an appendix 101 which extends from the control body 88 to be movable, in a regulation stroke, from an unlocked position (FIGS. 1,3), in which it does not interfere with said upper duct 80 and a locked position (FIGS. 2,4), wherein said upper duct 80 is occluded.

In other words, in the unlocked condition the upper duct is pervious and therefore allows the passage of hydraulic fluid from the sheath 48, 64 to the control body 88 and vice versa; instead, in the locked configuration such fluid passage is inhibited.

According to a possible embodiment, said damping 92 and control 100 valves are mechanically connected to each other.

The control body 88 is provided with at least one compensation volume 97, fluidically separate from the hydraulic fluid of the first and second sheaths 48, 64, delimited by a mobile septum 98 subjected to the pressure of the fluid coming from said sheaths 48, 64.

In turn, the compensation volume 97 is filled with a compressible fluid, such as gas.

According to a possible embodiment, the mobile septum 98 is connected to elastic means contained inside the compensation volume 97.

According to a possible embodiment (FIGS. 1-2) the first interconnection duct 84 is located at a lower end 102 of the first and second sheath 48, 64 opposite the upper duct 80 with respect to the heads 60, 76 of the first and second pistons 52, 68, so as to permit the passage of hydraulic fluid between the first and second sheaths 48, 64 during the extension motions of the respective pistons 52, 68.

According to one embodiment, the control valve 100 is configured so that in the locking position (FIG. 2), it occludes both the upper duct 80 and the first interconnection duct 84 so as to realize, in the locking configuration, a simultaneous constraint of the compression and extension motions of said first and second piston 52, 68.

For example the control valve comprises a pair of occluders 104, 106 so as to selectively each occlude the upper duct 80 and the first Interconnection duct 84 respectively.

For example, said occluders 104, 106 are discs, provided with a lateral edge 107 suitable to occlude the upper duct 80 and the first interconnection duct 84 when arranged in correspondence therewith, and provided with through openings 108 for the passage of fluid inside the control body 88.

According to a further embodiment (FIGS. 3-4) the first interconnection duct 84 fluidly connects the first sheath portion 48 above the first head 60 of the first piston 52 with the second sheath portion 64 under the second head 76 of the second piston 68.

Figure 3:
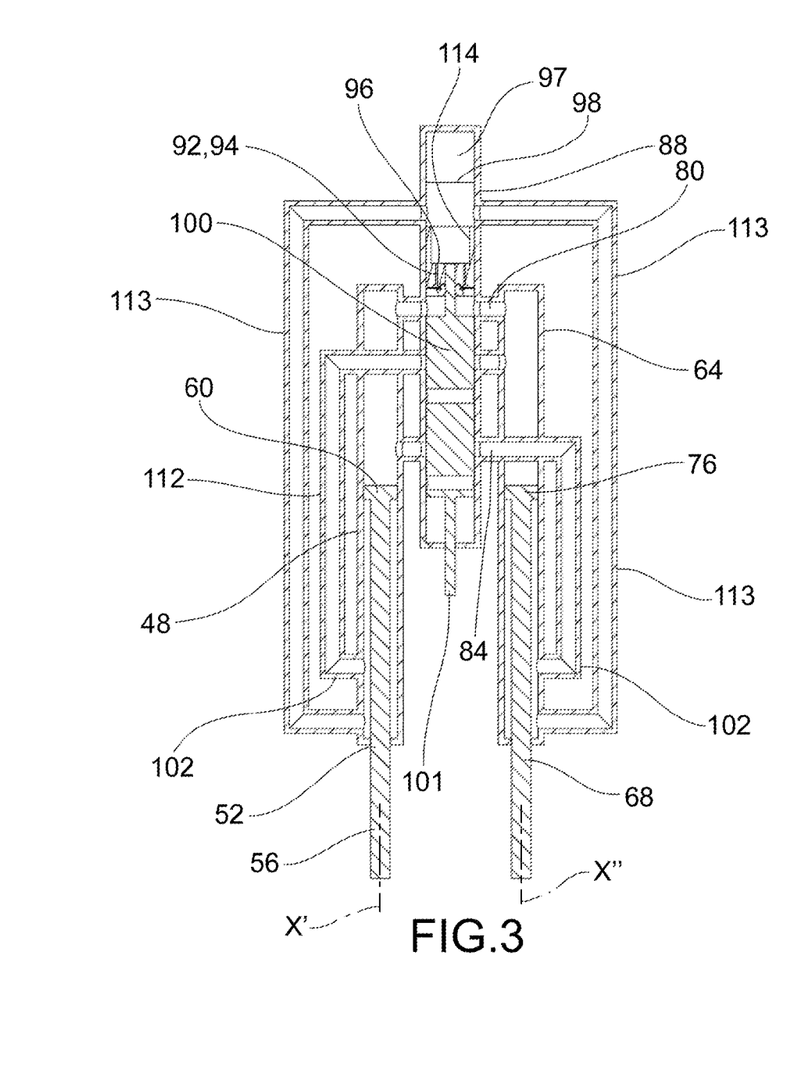
FIG. 3 shows a schematic, cross-section view of the shock absorber assembly in an unlocked configuration, according to a further embodiment of the present disclosure.
Figure 4:
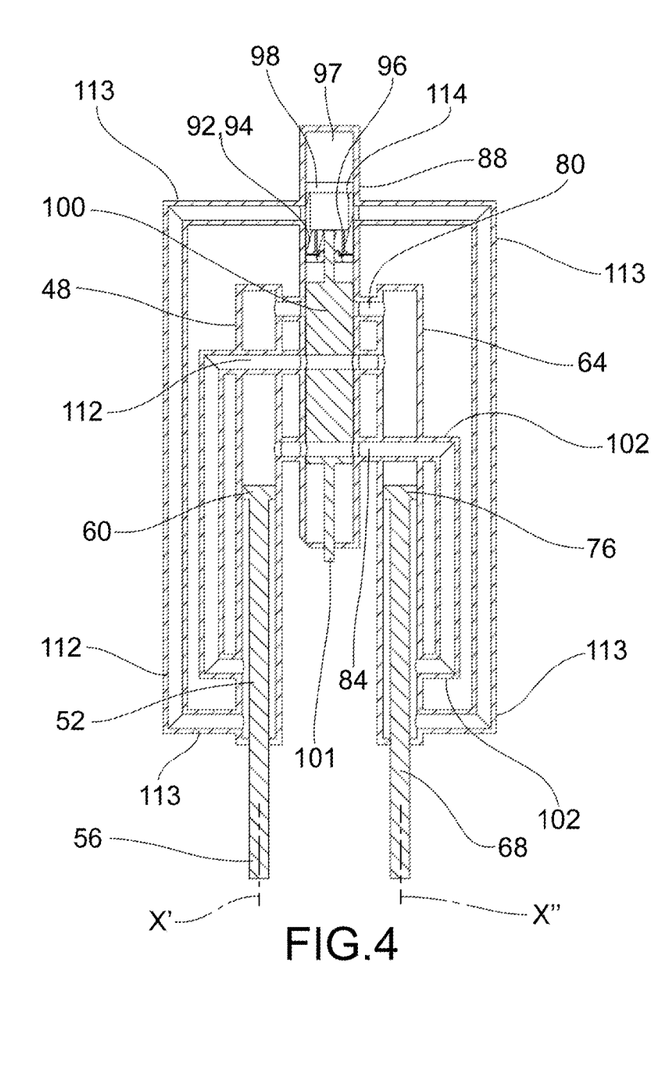
FIG. 4 shows a schematic view, in cross-section, of the shock absorber assembly in FIG. 3, in a locked configuration.
Figure 5:
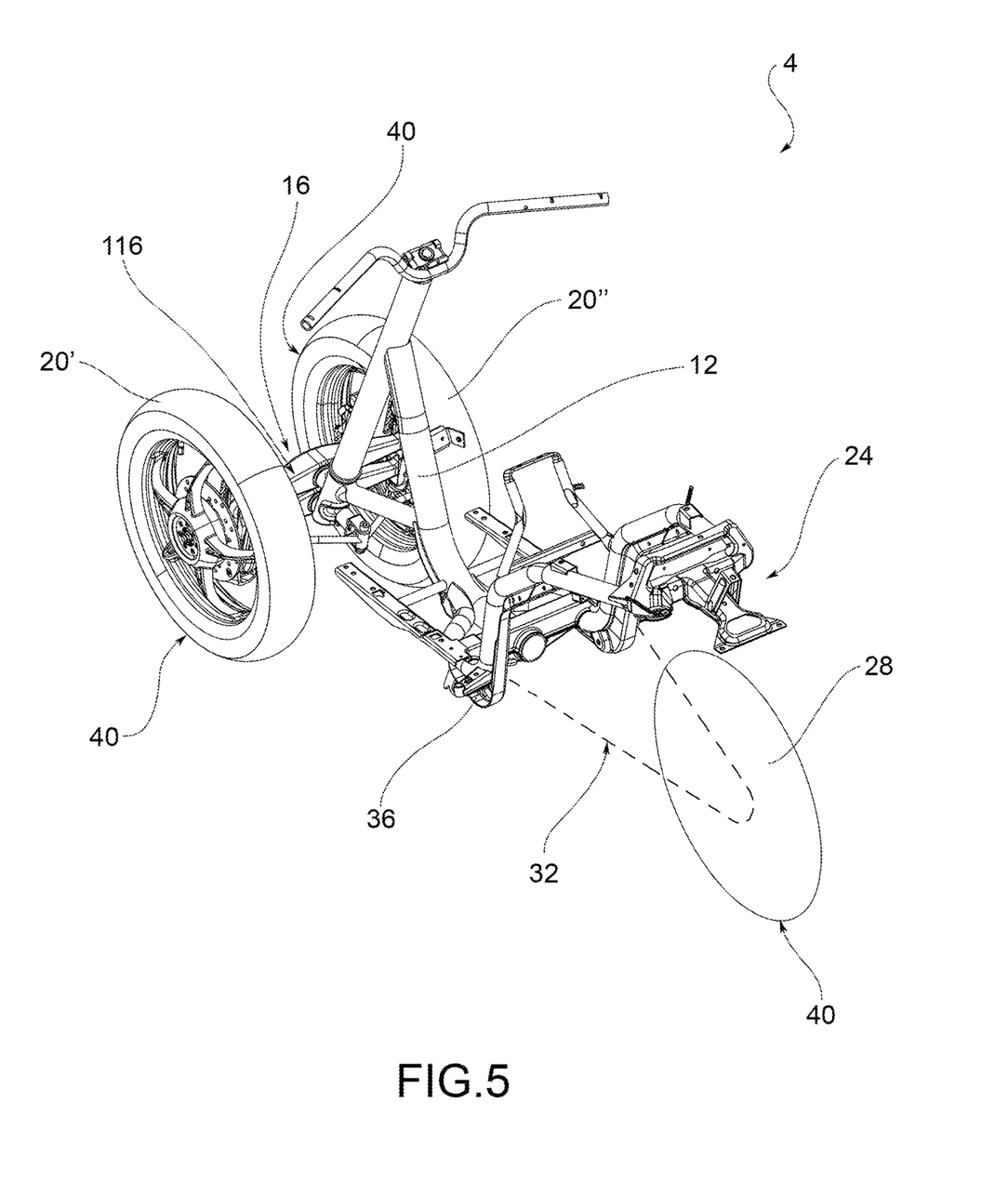
FIG. 5 shows a rear perspective view of a motor vehicle comprising a shock absorber assembly according to the present disclosure.
Figure 6:
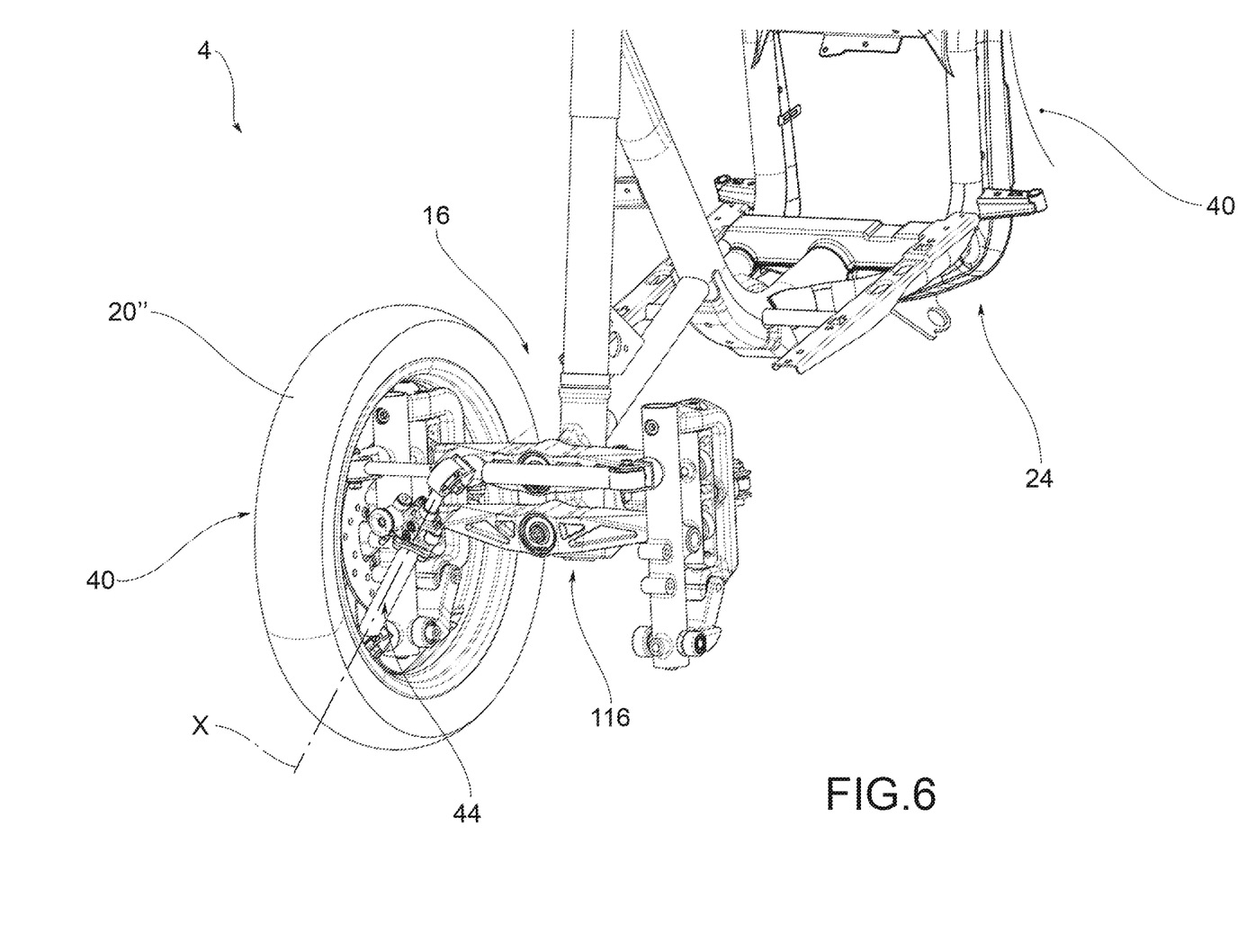
FIG. 6 is a front perspective view of a motor vehicle comprising a shock absorber assembly according to the present disclosure.

In addition, the shock absorber assembly 8 comprises a second interconnection duct 112 which fluidly connects the first sheath portion 48 under the first head 60 of the first piston 52 with the second sheath portion 64 above the second head 76 of the second piston 68.

The control valve 100 is configured so that in the unlocked condition (FIG. 3) it occludes said first and second interconnection ducts 84, 112 and leaves the upper duct 80 pervious.

In other words, in the unlocked configuration (FIG. 3), the first and second sheaths 48, 64 are fluidly connected to each other by the upper duct 80 only, while the control valve 100 occludes the hydraulic connections between said sheaths 48, 64 obtainable via the first and second interconnection ducts 84, 112.

In the same way the control valve 100 is configured so that in the locked condition (FIG. 4), it occludes the upper duct 80 and leaves said first and second interconnection ducts 84, 112 pervious.

For example, said control valve 100 is an axial valve which slides according to the adjustment stroke and is integral with the damping valve 92 provided with a damping plate 94 at least partially perforated, thanks to a through opening 108 for the calibrated passage of the hydraulic fluid.

The control valve 100 may, as seen, may be equipped with a control appendix 101 operatively connected to the actuating means (not shown) for driving it along the adjustment stroke.

According to one embodiment, the shock absorber assembly 8 comprises a third interconnection duct 113 which fluidly connects the first sheath portion 48 under the first head 60 of the first piston 52 with the second sheath portion 64 under the second head 76 of the second piston 68 passing through the control body 88 so as to create a fluid connection between said underlying portions and the damping valve 92. Such fluid connection, in the unlocked configuration, allows the hydraulic fluid to circulate through the damping valve 92.

According to one embodiment, the damping valve 92 comprises a cup portion 114 which, in the unlocked configuration allows a fluid connection between the first sheath 48 and the second sheath 64 through the third supply duct 113 and, in the locked configuration, occludes the third supply duct 113 at the control body 88.

For example said cup portion 114 comprises a mantle that occludes the through lumen of the third interconnection duct 113 in the locked configuration (FIG. 4); such cup portion 114 may be in one piece with the damping plate 94.

As mentioned above, the present disclosure applies to vehicles in general.

For example, said first and second stems 56, 72 can be mechanically connected to the same vehicle wheel and the respective sheaths 48, 64 can be mechanically connected to a vehicle frame or vice versa.

This is, for example, the case of a wheel supported by a fork, the stems of which coincide with said first and second stems 56,72.

In addition the present disclosure may be applied to a vehicle, preferably a motor vehicle, wherein said first and second stems 56, 72 are mechanically connected to two different vehicle wheels 20', 20" paired and interconnected with each other. For example, said different wheels are interconnected by means of an articulated quadrilateral structure 116 so as to be a tilting motor vehicle. Said articulated quadrilateral structure may be provided for on the forecarriage 16 (in which case the wheels 20', 20" are also steering) and/or on the rear axle 24.

The functioning of a suspension group for motor cycles according to the present disclosure will now be described.

In particular, in the unlocked configuration (FIG. 1) the upper duct 80 and the first interconnection duct 84 are free or pervious since the occluders 104,106 of the control valve 100 do not occlude the upper duct 80 and the first interconnection duct 84.

Figure 1:
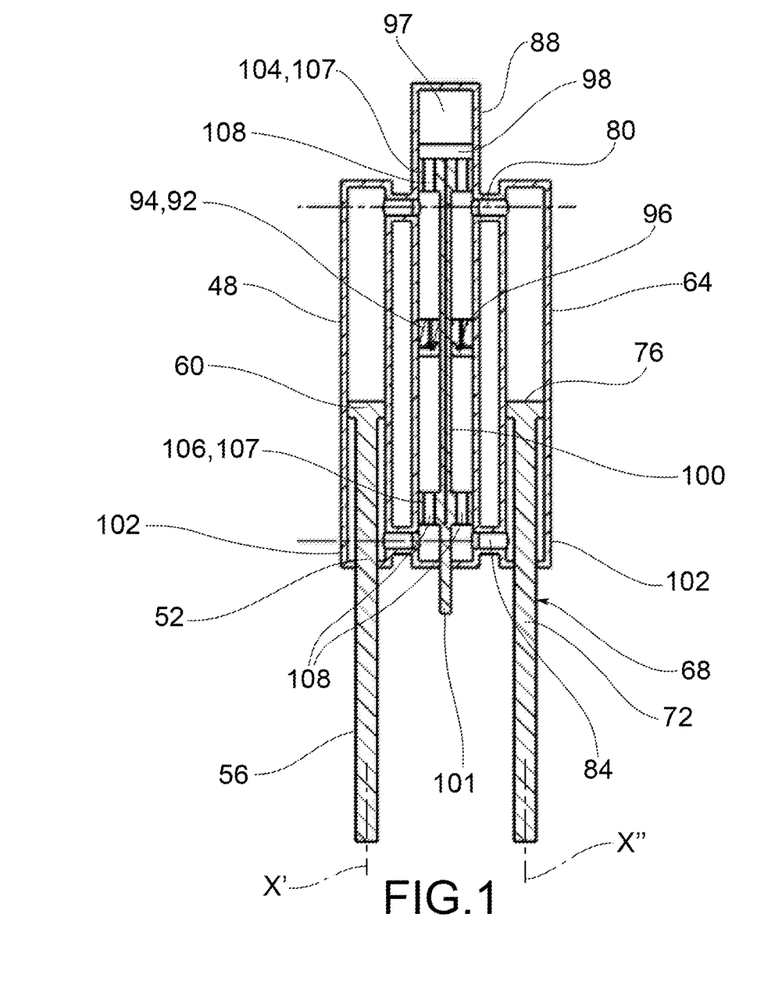
FIG. 1 shows a schematic view, in cross-section, of a shock absorber assembly in an unlocked configuration, according to one embodiment of the present disclosure.

This way, the hydraulic fluid is free to transit between the first sheath 48 and the second sheath 64 towards the control body 88, driven by the respective first and second piston 52, 68 both in its compression motion and in its extension motion.

In fact, in the compression motion the fluid passes through the upper duct 80 and in the extension motion the fluid is pushed into the first interconnection duct 84.

The compensation volume 97 is reduced or expanded according to the greater or lesser penetration of the relative first and second stems 56, 72 inside the first and second sheaths 48, 64 in a known manner.

The hydraulic fluid passing through the damping valve 92 is damped by it, by means of the calibrated passage through the relative holes 96.

In the locked configuration (FIG. 2), the occluders 104, 106 occlude the upper duct 80 and the first interconnection duct 84; this way the incompressible fluid is locked inside the first and second sheaths 48, 64 and with it the relative first and second piston 52,68 contained therein.

Figure 2:
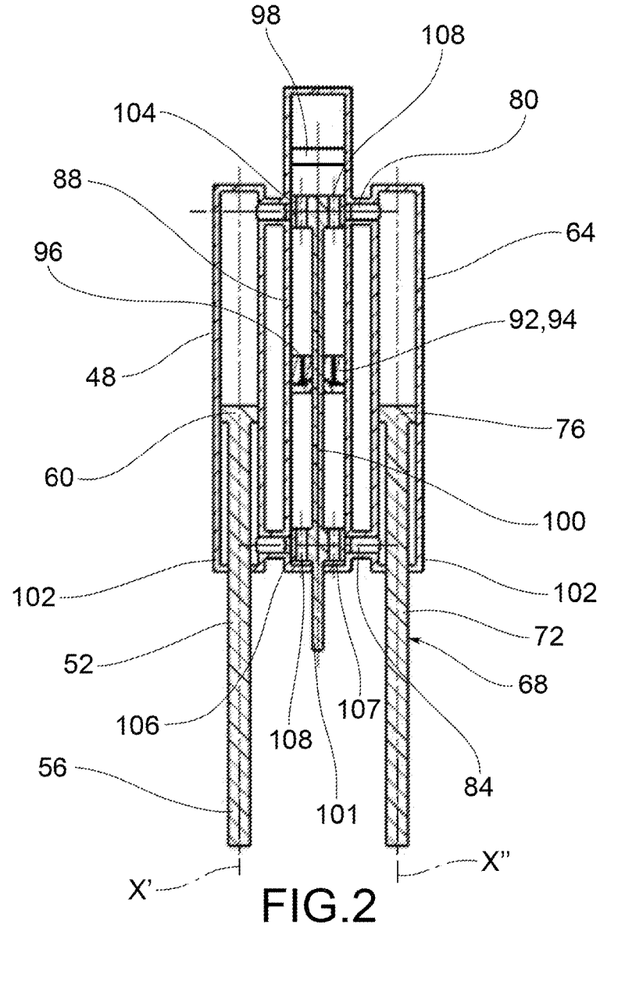
FIG. 2 shows a schematic view, in cross-section, of the shock absorber assembly in FIG. 1, in a locked configuration.

As a result the shock absorber assembly and the relative wheel 20 are not free to oscillate; the wheel in particular is constrained in the position it is in at the time of occlusion of the upper duct 80 and of the first interconnection duct 84.

The locked configuration is obtained by moving the control valve 100 of the relevant adjustment stroke using the actuators means acting, for example, on the appendix 101.

Obviously the subsequent unlocking of the shock absorber assembly 8 takes place by simply moving the control valve 100 so as to return the upper duct 80 and the first interconnection duct 84 to the pervious state.

In the embodiment of FIGS. 3-4, the unlocking condition is substantially equivalent to that already described.

In fact, in the unlocked configuration (FIG. 3) the control valve 100 occludes the first and second interconnection ducts 84, 112 which do not allow fluidic passage; instead, the upper duct 80 which allows the passage of hydraulic fluid into the control body 88 remains pervious. Inside the control body the fluid is damped through the damping valve 92 and by means of the compensation volume 97.

In addition, the third interconnection duct 113 fluidly connects the first sheath portion 48 under the first head 60 of the first piston 52 with the second sheath portion 64 under the second head 76 of the second piston 68 passing through the control body 88 so as to create a fluid connection between said underlying portions and the damping valve 92.

This fluid connection, in the unlocked configuration, allows, as seen, the circulation of the hydraulic fluid through the damping valve 92.

In the locked configuration (FIG. 4) the control valve 100 occludes the upper duct 80, while placing the first and second sheaths 48, 64 in communication by means of the first and second interconnection ducts 84, 112 which are instead pervious.

At the same time, the cup portion 114 of the damping valve 92 occludes the third supply duct 113 at the control body 88. Consequently, the third supply duct 113, in the locked configuration (FIG. 4), does not allow the circulation of hydraulic fluid.

In particular, as seen, the first interconnection duct 84 fluidly connects the first sheath portion 48 above the first head 60 of the first piston 52 with the second sheath portion 64 under the second head 68.

In addition, the second interconnection duct 112 fluidly connects the first sheath portion 48 under the first head 60 of the first piston 52 with the second sheath portion 64 above the second head 76 of the second piston 68.

This way, in the locked configuration, the strokes of the first and second stems 56,72 are not locked in an absolute sense but only in a relative sense; in other words, the two stems 56, 72 are constrained to have the same stroke and therefore the same axial position relative to the shock absorber assembly 8.

In fact, when locked, the hydraulic fluid may flow between the first and second sheaths 48, 64 without damping, since the damping valve 92 is bypassed, allowing a simultaneous movement of the stems 56, 72 which translates, on a tilting vehicle for example with two paired wheels 20'20" at the forecarriage 16, into a free pitch; the roll is instead inhibited since it would result in a difference between the strokes/shifts of the two stems 56, 72.

Obviously this is valid to the extent that said first and second interconnection ducts 84, 112 contain the same volume of hydraulic fluid, i.e. are equal in length and calibre.

The uses of locking the shock absorber assembly 8 according to the disclosure may be manifold.

For example, the shock absorber assembly 8 may perform the control/locking function of the stroke of the relative wheel; moreover, by locking the stroke of the wheel 20',20", it can perform the locking function of the pitch and/or roll movements of a motor vehicle, according to the envisaged embodiments, as described above.

Of course, the locking of the roll can be achieved, thanks to the present disclosure, in vehicles comprising at least three wheels (of which two paired wheels at the forecarriage or rear axle) and in vehicles with four wheels.

Furthermore, such locking of the stroke of the wheels can also be used as a vehicle anti-theft function.

As may be appreciated from the description, the present disclosure makes it possible to overcome the drawbacks mentioned of the prior art.

In particular, the shock absorber assembly and suspension with selective locking allows, unlike the prior solutions, total locking of the suspension in both directions, of compression and extension, or even only, in the case of application to three-wheel tilting vehicles or four-wheel vehicles, locking of the roll, allowing the pitch movement.

Such selective kinematic locking takes place in a simple, reliable and economical manner.

The disclosure thus makes it possible to fix a specific motorcycle set-up, in terms of roll and/or pitch, in stationary or limited speed conditions, below a certain threshold value.

The solution is simple and economical, and can also be applied to pre-existing suspension solutions as an add-on or retrofit.

A person skilled in the art may make numerous modifications and variations to the shock absorber assemblies described above so as to satisfy contingent and specific requirements while remaining within the sphere of protection of the disclosure as defined by the following claims.

The invention claimed is:

1. Shock absorber assembly comprising
a first sheath, slidingly housing inside it a first piston along a first sliding direction (X'-X'), the first sheath being filled with hydraulic fluid, the first piston comprising a first stem extending from the first sheath and a first head contained inside the first sheath, the first stem and the first sheath being suitable to be mechanically connected respectively to a wheel and to a frame or vice versa,
a second sheath, slidingly housing inside it a second piston along a second sliding direction (X'''-X'''), the second sheath being filled with hydraulic fluid, the second piston comprising a second stem extending from the second sheath and a second head contained inside the second sheath, the second stem and the second sheath being suitable to be mechanically connected respectively to a wheel (20, 20', 20'') and to a frame or vice versa,
wherein the first and second sheaths are fluidly connected to each other by means of at least one upper duct and a first interconnection passage passing through a control body,
the first and second piston moving according to a motion of compression or juxtaposition of the respective first and second heads to the upper duct, and a motion of extension or distancing of the respective first and second heads from the upper duct,
wherein said control body houses at least one damping valve comprising a damping plate having holes suitable to allow a calibrated passage of the hydraulic fluid channelled by the first and second sheaths towards the control body,
said control body houses a control valve connected to actuator means to be movable, in a regulation stroke, from an unlocked position, in which it does not interfere with said upper duct and a locked position, wherein said upper duct is occluded.

2. The shock absorber assembly according to claim 1, wherein said damping valve and control valve are mechanically connected to each other.

3. The shock absorber assembly according to claim 1, wherein the first interconnection duct is located at a lower end of the first and second sheath opposite the upper duct with respect to the heads of the pistons, so as to permit the passage of hydraulic fluid between the first and second sheaths during the extension motions of the respective pistons.

4. The shock absorber assembly according to claim 3, wherein the control valve is configured so that in the locking position, it occludes both the upper duct and the first interconnection duct so as to realize, in the locking configuration, a simultaneous constraint of the compression and extension motions of said first and second piston.

5. The shock absorber assembly according to claim 1, wherein said control valve comprises a pair of occluders so as to selectively each occlude the upper duct and the first Interconnection duct respectively.

6. The shock absorber assembly according to claim 5, wherein said occluders are discs, provided with a lateral edge suitable to occlude the upper duct and the first interconnection duct when arranged in correspondence therewith, and provided with through openings for the passage of fluid inside the control body.

7. The shock absorber unit according to claim 1, wherein the first interconnection duct fluidly connects the first sheath portion above the first head of the first piston with the second sheath portion under the second head of the second piston, and wherein the assembly further comprises a second interconnection duct which fluidly connects the first sheath portion under the first head of the first piston with the second sheath portion above the second head of the second piston.

8. The shock absorber assembly according to claim 7, wherein the control valve is configured so that in the unlocked condition, it occludes said first and second interconnection ducts and leaves the upper duct pervious.

9. The shock absorber assembly according to claim 7, wherein the control valve is configured so that in the locked condition, it occludes the upper duct and leaves said first and second interconnection ducts pervious.

10. The shock absorber assembly according to claim 7, wherein said control valve is an axial valve which slides according to the adjustment stroke and is integral with the damping valve provided with a damping plate at least partially perforated for the passage of the hydraulic fluid.

11. The shock absorber assembly according to claim 10, wherein the control valve is provided with a control appendix operatively connected to the actuating means for driving it along the adjustment stroke.

12. The shock absorber assembly according to claim 7, comprising a third interconnection duct which fluidly connects the first sheath portion under the first head of the first piston with the second sheath portion under the second head of the second piston passing through the control body so as to create a fluid connection between said underlying portions and the damping valve.

13. The shock absorber assembly according to claim 12, wherein said damping valve comprises a cup portion which, in the release configuration, allows a fluid connection between the first sheath and the second sheath through the third supply duct and, in the locking configuration, occludes the third supply duct at the control body.

14. The shock absorber assembly according to claim 1, wherein the control body is provided with at least one compensation volume, fluidically separate from the hydraulic fluid of the first and second sheaths, delimited by a mobile septum subjected to the pressure of said first and second sheaths.

15. The shock absorber assembly according to claim 14, wherein said compensation volume is filled with a compressible fluid.

16. The shock absorber assembly according to claim 14, wherein said mobile septum is connected to elastic means contained inside the compensation volume.

17. A wheel assembly comprising a shock absorber assembly according to claim 1, wherein said first and second stems are mechanically connected to the same vehicle wheel and the respective first and second sheaths are mechanically connected to a vehicle frame, or vice versa.

18. A wheel assembly comprising a shock absorber assembly according to claim 1, wherein said first and second stems are mechanically connected to two different vehicle wheels paired and interconnected with each other.

19. Vehicle comprising a wheel assembly according to claim 17.

20. A vehicle comprising a wheel assembly according to claim 19, wherein said different wheels are interconnected by means of an articulated quadrilateral structure so as to be a tilting motor vehicle.

\* \* \* \* \*